Figure 1:
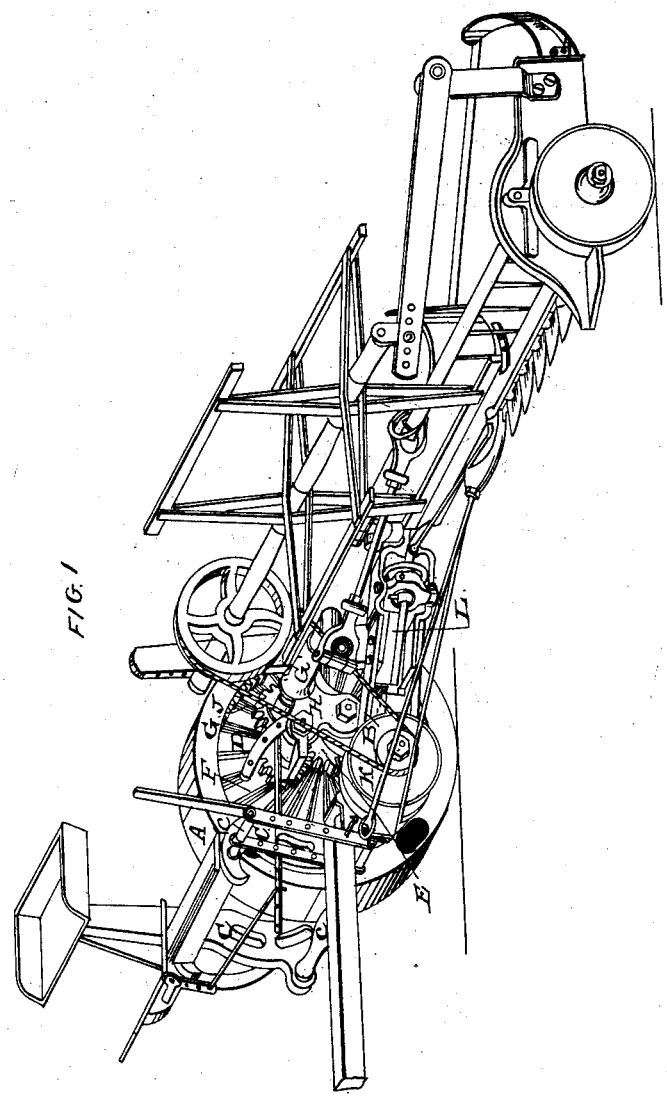

W. F. COCHRANE.
Harvester.

No. 46,182.

2 Sheets—Sheet 1.

Patented Jan'y 31, 1865.

WITNESSES

INVENTOR

W. F. COCHRANE.
Harvester.
No. 46,182.
2 Sheets—Sheet 2.
Patented Jan'y 31, 1865.
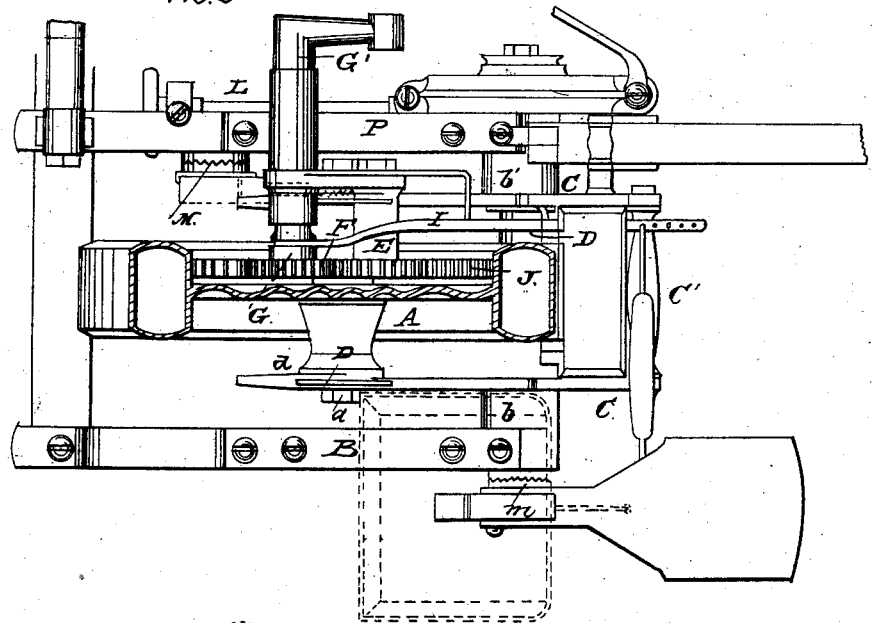
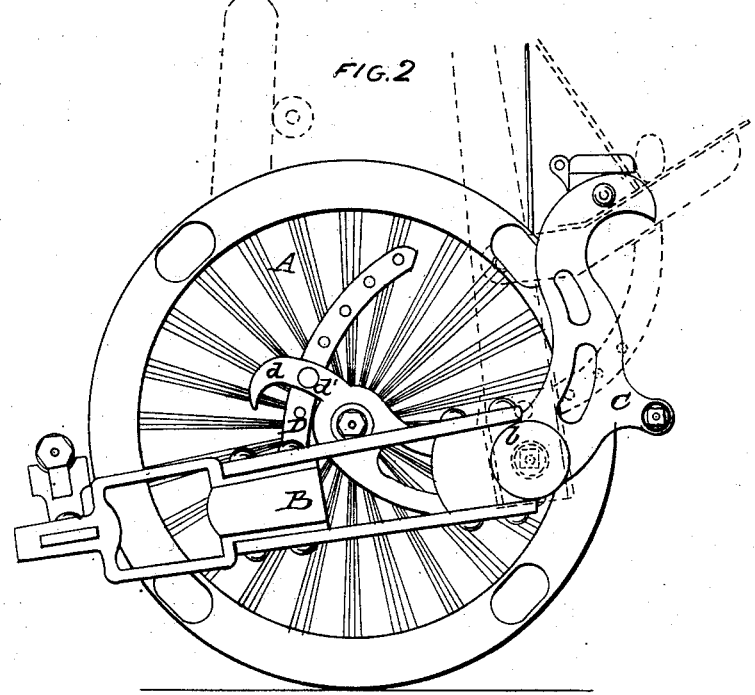
WITNESSES
INVENTOR

UNITED STATES PATENT OFFICE.

WM. F. COCHRANE, OF SPRINGFIELD, OHIO, ASSIGNOR TO HIMSELF AND WARDER & CHILD, OF SAME PLACE.

IMPROVEMENT IN HARVESTERS.

Specification forming part of Letters Patent No. 46,182, dated January 31, 1865.

*To all whom it may concern:*

Be it known that I, WILLIAM F. COCHRANE, of Springfield, in the county of Clarke and State of Ohio, have invented a certain new and useful Improvement in Harvesters, of which the following is a full, clear, and exact description, reference being had to the accompanying drawings, which make part of this specification, and in which—

Figure 1 represents a view in perspective of a self-raking harvester embracing my improvement. Fig. 2 represents a view in elevation of the outer or stubble side of the same; and Fig. 3 represents a plan or top view of the main or gearing frame of the same, with the driving-wheel in section.

The improvement herein claimed consists in so combining with the horizontal main frame of a harvester a swan-shaped vertical frame as to secure a strong rigid frame, and yet one which can readily be raised or lowered without deranging the gearing.

In the accompanying drawings, the driving-wheel A is shown as inclosed by the main frame B, to which it is connected by a swan-shaped supplementary frame consisting of two similarly-shaped side pieces C, arranged parallel to each other, and firmly united by cross-braces $c$ $c'$ in front and by the axle $a$ of the driving-wheel behind. The driving-wheel revolves loosely on this axle, which is firmly secured to the side pieces, thus bracing and stiffening the frame. The side pieces B of the main frame are pivoted to the supplementary frame at its lowest point by means of brackets $b$ $b'$ projecting therefrom, so as to turn freely thereon. Curved arms D likewise extend upward from the main frame, passing through slots in the projecting ends $d$ of the pieces C, which extend back of the axle. Pins $d'$ pass through any one of a series of holes in the curved arms D and through these projecting ends, so as to hold the frame at any desired height from the ground. By this arrangement the side pieces B, the supplementary frame C, and the curved arms D form two parallel triangles, (firmly united by the cross-braces and axle,) of which the axle of the driving-wheel forms the center, by which means I secure a strong rigid frame, and one which can readily be raised and lowered.

In this instance the driving-wheel revolves loosely on its shaft. A spur-wheel, E, on the hub of the driving-wheel gears into an idle-wheel, F, which in turn drives a pinion, G, on the crank-shaft G' of the rake. This idle-wheel, pinion, and crank-shaft are mounted in bearings in a solid metal frame or plate, H, secured to one of the vertical side pieces C by means of a screw and creased clutch, $h$, (shown in red in Fig. 3,) similar to that which sustains the seat for the driver, as shown at M, Fig. 3. By this arrangement the raking mechanism can readily be detached by simply removing a screw.

The raking mechanism is thrown into and out of gear by sliding the pinion G endwise on its shaft in the usual way, which movement is effected by a compound shifting-lever, I, actuated by the foot of the driver, as shown in the drawings.

An internally-geared spur-wheel, J, on the driving-wheel drives a spur-pinion on a counter-shaft, having its bearings in the bracket $b'$ and carrying on its outer end a bevel-wheel, K, which drives a corresponding pinion on a crank-shaft, L, which vibrates the cutters, through a crank and pitman, in the usual way.

In the drawings a completely organized self-raking reaper is shown; but it is deemed unnecessary here to describe in detail the construction and operation of the several parts, as they form no part of the subject-matter herein claimed. They are, moreover, fully described in another application for Letters Patent of the United States filed by me simultaneously with this, and marked "Division G," and in five several applications filed by me on the 20th day of December, 1864, and respectively marked Divisions "A," "B," "C," "D," and "E."

What I claim herein as new, and desire to secure by Letters Patent of the United States, is—

The combination, with the horizontal main frame of a harvester, of a swan-shaped vertical frame, C, substantially in the manner described, for the purposes set forth.

In testimony whereof I have hereunto subscribed my name.

WM. F. COCHRANE.

Witnesses:
 WILLIAM MOORE,
 MARION MOORE.